US010596643B2

(12) United States Patent
Bordignon et al.

(10) Patent No.: US 10,596,643 B2
(45) Date of Patent: Mar. 24, 2020

(54) SINGLE SHEAR FOR CUTTING AND CONVEYING MULTIPLE ROLLED SECTIONS

(71) Applicant: Danieli & C. Officine Meccaniche S.p.A., Buttrio (IT)

(72) Inventors: Giuseppe Bordignon, Bicinicco (IT); Miroslav Zerajic, Palmanova (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 384 days.

(21) Appl. No.: 15/027,221

(22) PCT Filed: Oct. 8, 2014

(86) PCT No.: PCT/EP2014/071524
§ 371 (c)(1),
(2) Date: Apr. 4, 2016

(87) PCT Pub. No.: WO2015/052227
PCT Pub. Date: Apr. 16, 2015

(65) Prior Publication Data
US 2016/0236288 A1    Aug. 18, 2016

(30) Foreign Application Priority Data
Oct. 9, 2013   (IT) ............................. MI2013A1670

(51) Int. Cl.
*B23D 33/02*   (2006.01)
*B23D 25/12*   (2006.01)
(Continued)

(52) U.S. Cl.
CPC .......... *B23D 33/02* (2013.01); *B21B 15/0007* (2013.01); *B23D 25/12* (2013.01); *B21B 39/18* (2013.01); *B21B 2015/0021* (2013.01)

(58) Field of Classification Search
CPC ........ B23D 33/02; B23D 25/12; B23D 19/04; B23D 36/0083; B21B 15/0007;
(Continued)

(56) References Cited

U.S. PATENT DOCUMENTS

| 3,073,426 A * | 1/1963 | Hill ......................... B21B 39/18 |
| | | 193/39 |
| 3,121,484 A * | 2/1964 | Hill ......................... B21B 39/18 |
| | | 193/39 |

(Continued)

FOREIGN PATENT DOCUMENTS

| EP | 0773082 | 12/1999 |
| FR | 1129372 | 1/1957 |

*Primary Examiner* — Evan H MacFarlane
(74) *Attorney, Agent, or Firm* — Stetina Brunda Garred & Brucker

(57) ABSTRACT

The single shear described herein for cutting and simultaneously conveying one or more pairs of rolling wires or bars includes a mobile diverter consisting of at least two channels in each of which a wire or bar slides. The single shear further includes at least two pairs of counter-knives, each of which acts on the wire or bar, and a conveying device for conveying the cut segments of wires or bars. The conveying device may include at least one pair of mobile elements configured to be independent of each other, but configured to be synchronized with each other and with the mobile diverter for the separate management of each of said cut sections of wires or bars. The single shear may finally include at least two pairs of output channels for conveying the cut segments of wires or bars.

3 Claims, 2 Drawing Sheets

(51) Int. Cl.
*B21B 15/00* (2006.01)
*B21B 39/18* (2006.01)

(58) Field of Classification Search
CPC ............ B21B 2015/0014; B21B 39/18; B21B
43/003; Y10T 83/2074; Y10T 83/2085;
Y10T 83/2083; Y10T 83/2087; Y10T
83/4017; Y10T 83/738; Y10T 83/739;
Y10T 83/741; Y10T 83/2209; Y10T
83/2216; B21C 47/3433; B21C 47/3441;
B65G 47/64; B65G 47/641; B65G
47/642; B65G 47/643; B65G 11/20;
B65G 11/203
USPC ........................................ 193/39, 31 R, 31 A
See application file for complete search history.

(56) References Cited

U.S. PATENT DOCUMENTS

| | | | |
|---|---|---|---|
| 4,966,060 A | 10/1990 | Poloni | |
| 5,644,941 A | 7/1997 | Stodt et al. | |
| 6,684,745 B2 | 2/2004 | Shen et al. | |
| 2016/0151815 A1* | 6/2016 | Alb | B21B 15/0007 83/23 |

* cited by examiner

SINGLE SHEAR FOR CUTTING AND CONVEYING MULTIPLE ROLLED SECTIONS

CROSS REFERENCE TO RELATED APPLICATIONS

The present application claims priority to PCT International Application No. PCT/EP2014/0715241 filed on Oct. 8, 2014, which application claims priority to Italian Patent Application No. MI2013A001670 filed Oct. 9, 2013, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The field of the invention is the production of rolled sections, such as wires or bars, for example by means of a "slit" process.

BACKGROUND ART

Slit plants with two or more wires are used to increase the production of wires and/or bars. They provide that, after the passage of the starting billet in one or more rolling cages or units to reach a substantially rectangular section, the rolled section is slit longitudinally into two or more equal parts through the passage within channels made into specially shaped rolling rollers, making two or more rolled sections which move in parallel and consequently creating two or more parallel side by side rolling lines.

In the prior art, the two wires that are created through the process of longitudinal slitting of the rolled section are then processed separately by means of different machinery. This is mainly due to the physical and metallurgical differences that each wire or bar has, with the consequent need to separate the rolled wires or bars to be able to ensure a homogeneous and uniform processing thereof. The two wire slit thus allows increasing the production but also entails a considerably higher cost as regards the machinery, the related spares and the maintenance of what is located downstream of the slitting.

An essential aspect for the cutting and management of the rolling wires or bars consists of the speed and effectiveness of the shear, which must slit with precision and subsequently convey the sections thus obtained without undergoing hitches of a mechanical nature. In the plants currently in operation this aspect, linked to the increasingly growing production, has now taken primary importance and the necessity of having to use a shear for each wire or bar therefore is a considerable limitation and an increase of complexity for both the plant and for the effectiveness of the process itself.

An example of a single machinery to process the two lines is known from document EP0773082, which describes a single shear which cuts two parallel wires. However, the two wires are kept spaced apart and the two lines are separate, thus requiring separate equipment upstream and downstream for the two wires.

Also U.S. Pat. No. 4,966,060 refers to a high-speed shear system for cutting rolling wires or bars wherein a pair of cutting knives acts on each wire or bar while a specially shaped partitioning template allows the cut section of wire to enter output channels. However, the choice of the output channel is governed by the lateral mechanical displacement of the guide, thus slowing down the separation process and with the high risk that the cut wire enters the wrong output channel, or even worse, gets stuck between the partitioning template and the guide itself, thus locking the plant.

Another system for cutting rolling wires is disclosed in document U.S. Pat. No. 5,644,941, which describes a system for cooling and cutting single wires or rods by means of facing pairs of knives. Also in this case, the system is rather complex basically due to the fact that every single wire must be slit and conveyed separately to the output guides, with issues related to the management and the spacing between one wire and the other.

Finally, also U.S. Pat. No. 6,684,745 describes a shear for cutting rolling wires or bars which has, for each of them, different series of coupled knives and a complex system of guides for the management of the cutting and the positioning of the wires themselves. Also for this solution, the major problems are found in the multiplicity of devices in case of different wires and in the difficult management of the cutting tails in output from the shear, which must be conveyed individually in the respective separation channels.

SUMMARY OF THE INVENTION

On the basis of the limitations and problems encountered in the prior art shear systems and plants, it is a primary object of the present invention to provide a single shear which allows cutting to size two adjacent and parallel wires with single machinery.

Another object of the present invention is to provide a shear for cutting to size which could be inserted in a line that processes two adjacent and parallel wires together, produced by the slit process or coming from two separate lines.

A further object of the invention is to provide a shear that is able to seamlessly manage the cutting and the subsequent distribution of the cut wire or bar heads within output channels, even in a high-speed cutting condition.

These and other objects are achieved by a single shear for cutting and simultaneously conveying one or more pairs of rolling wires or bars which, according to claim 1, comprises the following parts:

a) a mobile diverter consisting of at least two channels in each of which a wire or bar can slide;

b) at least two pairs of counter-rotating knives, each pair of counter-rotating knives acting on a respective wire or bar producing respective segments of wire or bar;

c) a conveying device for conveying the segments of wire or bar, comprising
    at least two pairs of output channels for conveying the segments of wire or bar,
    at least one pair of mobile elements configured so as to be independent of each other and synchronized with each other and with the mobile diverter for a separate management of each of said segments of wire or bar so as to facilitate the insertion of each segment of wire or bar in a respective output channel of said pairs of output channels.

According to another aspect of the invention, the problems mentioned above are solved by means of a method of cutting and conveying rolling wires or bars making use of the shears described herein which, according to claim 10, comprises the following sequence of steps:

a) providing the diverter in a first conveying position, and simultaneously lowering a first mobile element up to a total opening of a respective first central channel and raising a second mobile element up to a total closing of a second central channel;

b) moving the diverter in a first direction towards a cutting position, intermediate between said first conveying position and a second conveying position, and simultaneously raising the first mobile element up to a partial closure of the first central channel and lowering the second mobile element up to a partial opening of the second central channel;

c) moving the diverter in said first direction up to reaching said second conveying position, and simultaneously raising the first mobile element up to a total closure of the first central channel and lowering the second mobile element up to a total opening of the second central channel;

d) moving the diverter in a second direction, opposite to the first direction, towards the cutting position, and simultaneously lowering the first mobile element up to a partial opening of the first central channel and raising the second mobile element up to a partial closure of the second central channel;

e) moving the diverter in said first direction up to reaching said first conveying position;

f) repeating steps a)-e).

In the following description, it is understood that the term wire, for reasons of brevity, also refers to the rolled bar product. Moreover, a two-wire slit process is taken as an example but it is understood that the invention also refers without distinction to the cutting of multiple parallel wires not coming from a slit process or to the cutting of three, four, five or more wires coming from a slit process.

The single shear according to the present invention offers the possibility of cutting to commercial size two or more adjacent and parallel wires and, therefore, of simultaneously managing different sliding lines without the need to adopt multiple and specific solutions for each rolling product. Moreover, the synchronization between the mobile diverter and the conveying device allows obtaining a rapid and effective separation of the cutting heads without the risk that they can enter wrong output channels or, even worse, come into contact with one another with consequent locking of the entire plant.

The particular configuration of the mobile conveying elements according to the present invention offers a double advantage: on the one hand, they have sliding surfaces configured so as to guide the displacement of the wires after cutting, thus favoring the proper conveying thereof and, at the same time, they constitute actual elements for opening and closing the output channels of the cut wires, which make the distribution of the cut sections effective and safe even in high-speed condition. This therefore allows the management of a larger number of wires in a single cutting process without mechanical or structural limitations of any kind.

BRIEF DESCRIPTION OF THE FIGURES

Further features and advantages of the invention will be more apparent in light of the detailed description of a preferred, but not exclusive, embodiment of a single shear according to the present invention for a two-wire production plant, shown by way of a non-limiting example with the aid of the accompanying drawings, in which:

FIG. 3a shows the position of the mobile conveying elements during the opening and closing steps of the output channels of the wires corresponding to the position in FIG. 1a.

Same reference numerals in the various figures correspond to the same elements or components.

DETAILED DESCRIPTION OF PREFERRED EMBODIMENTS OF THE INVENTION

Figure 1C:
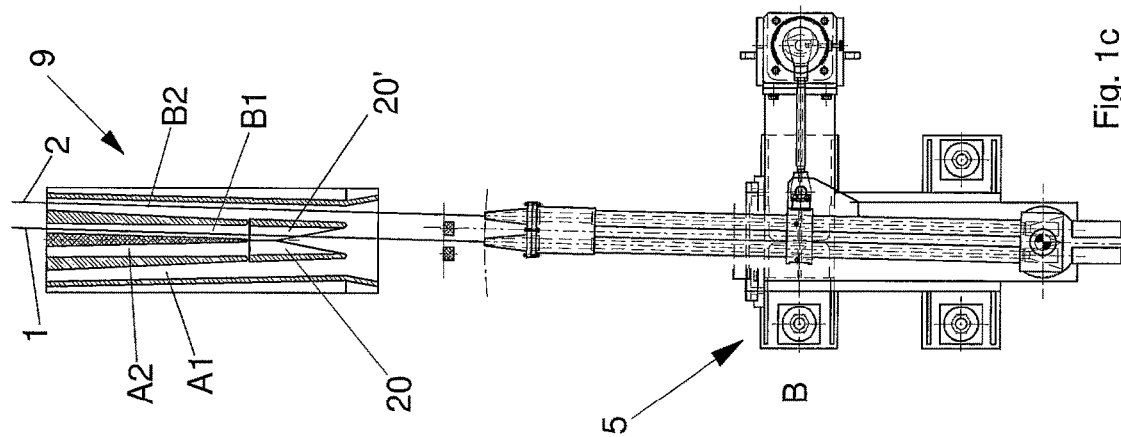
FIG. 1c shows a schematic top view of all the components of the shear in a second conveying position of the wires.

The component parts of the shears of the present invention are shown in FIG. 1.

The shear consists of two knife-holding drums, an upper one and a lower one, on each of which at least two pairs of counter-rotating knives 3, 4 are arranged, each arranged for cutting to size one of the two wires 1, 2.

Diverter 5 upstream of the two knife-holding drums, includes two channels 6, 7 in each of which a wire slides; diverter 5 switches from a first conveying position A to a second conveying position B and vice versa, so that the wires are cut during this movement, at an intermediate cutting position T between positions A and B, wherein wires 1, 2 cross the counter-rotating knives 3, 4.

On the side distal to diverter 5, downstream of the knife-holding drums, the shear has a conveying device 9 having four separate output channels A1, A2, B1 and B2 in which the segments of wire cut to size are entered.

According to a preferred configuration of the invention, the conveying device 9 comprises a lower surface 18, defining a base of the device, an upper surface 19 which delimits the height of the output channels, and two outer lateral walls 10, 10', which connect the lower surface 18 to the upper surface 19 and which extend as close as possible to the cutting area for conveying the heads of the wire segments just cut in the correct channel.

A first pair of output channels includes:
a first lateral channel A1, or first outer channel, delimited by the outer lateral wall 10 and by an intermediate partition 11;
and a first central channel A2, or first inner channel, delimited by the intermediate partition 11 and by a central partition 12.

A second pair of output channels includes:
a second central channel B1, or second inner channel, delimited by the central partition 12 and by an intermediate partition 11';
and a second lateral channel B2, or second outer channel, delimited by the intermediate partition 11' and by the outer lateral wall 10'.

The central channels A2 and B1 are adjacent and are separated from each other by the central partition 12.

Figure 1B:
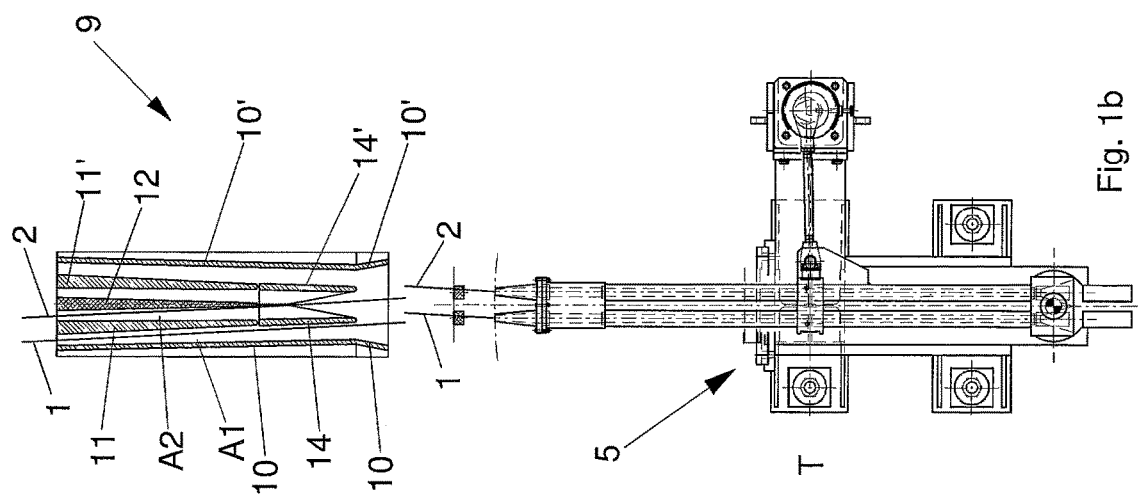
FIG. 1b shows a schematic top view of all the components of the shear in a position where the wires are cut.
Figure 1A:
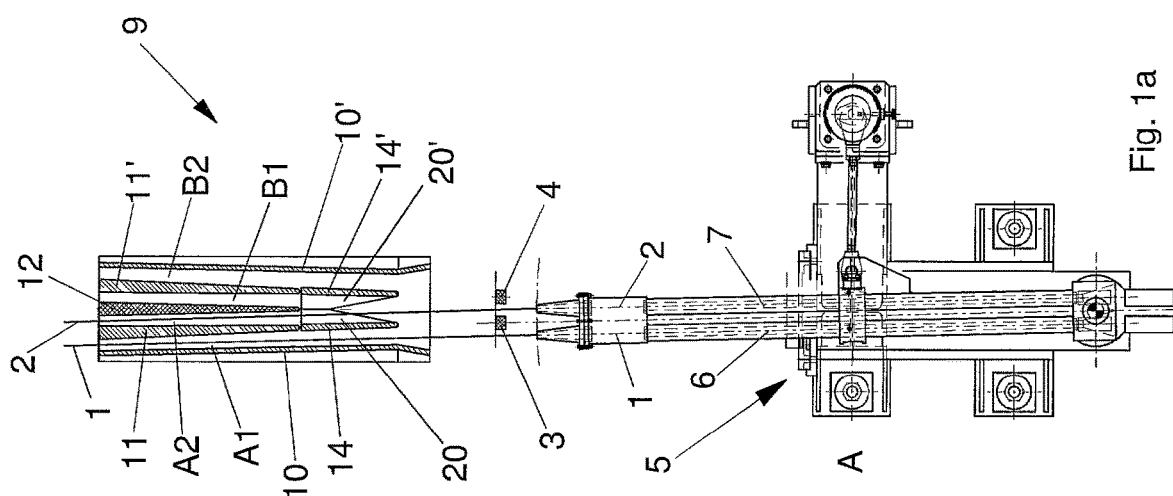
FIG. 1a shows a schematic top view of all the components of the shear in a first conveying position of the wires.

When diverter 5 is in position A, as shown in FIG. 1a, wire 1 continues its run in the lateral channel A1, while wire 2 does so in the central channel A2.

When diverter 5 moves to the right to reach position B, at the intermediate position T (FIG. 1b), wire 1 is cut by a pair of knives 3 while wire 2 is cut by a pair of knives 4; the tails of the wire segments just cut continue in channels A1 and A2 while the new heads of the two wires 1 and 2, continuing the displacement of diverter 5 to the right, reach and continue in channels B1 and B2.

Therefore, when diverter 5 is in position B, as shown in FIG. 1c, wire 1 continues its run in the central channel B1, while wire 2 does so in the lateral channel B2. Diverter 5 remains in position B up to a new displacement to the left, and thus a new cut at the intermediate position T (FIG. 1b).

Figure 2:
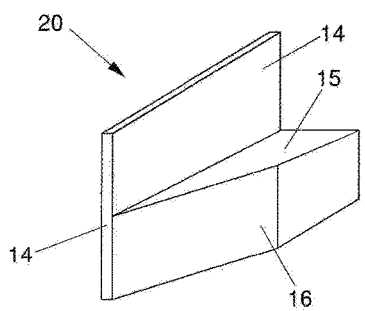
FIG. 2 shows a schematic representation of one of the mobile conveying elements.

To prevent the heads of the wires just cut from entering the wrong central channel, the path thereof is advantageously constrained with independently mobile elements 20, 20, synchronized with each other and with diverter 5. FIG. 1 shows where these elements 20, 20' are preferably positioned inside the conveying device 9, while FIG. 2 schematically shows a possible shape of the mobile element 20. The mobile element 20 is positioned before the central channel A2, while the mobile element 20' is positioned before the central channel B1. Both said mobile elements 20, 20' are positioned (FIG. 1) in a central front area of device 9 between the outer lateral walls 10, 10'.

According to a preferred variant of the invention, the two mobile elements 20, 20' arranged mirror-wise with each other, are synchronized to move vertically, in the direction opposite to each other, and alternately open and close the two central channels A2 and B1 according to the position of diverter 5.

The mobile elements 20, 20' used in the shears according to the present invention include:
  a lateral containment wall 14, 14', arranged substantially vertically;
  a sliding surface 15, 15' for the wires entering the conveying device 9, arranged transversely to said lateral containment wall 14, 14',
  a conveying surface 16, 16' inclined with respect to the lateral containment wall 14, 14', and also arranged substantially vertically.

The sliding surface 15 and the conveying surface 16 are outer surfaces of a wedge-shaped element having its base resting on the lateral containment wall 14.

The thickness of said wedge-shaped element is minimum at the entrance side of the wires in the conveying device 9, i.e. at the front end of the lateral containment wall 14.

More in detail, the first lateral channel A1 is delimited on one side by the outer lateral wall 10, and on the other side initially by the lateral containment wall 14 and then by the intermediate partition 11; while the second lateral channel B2 is delimited on one side by the outer lateral wall 10' and on the other side initially by the lateral containment wall 14' and then by the intermediate partition 11'.

Advantageously, the sliding surfaces 15, 15' may be inclined downwards, starting from the inlet side of the wires or bars 1, 2, in order to accompany the wire or bar 1, 2 towards the corresponding central output channel A2, B1.

Preferably, the height of the lateral containment wall 14, 14' of the mobile elements 20, 20' is greater than or equal to the distance between the lower surface 18 and the upper surface 19 of the conveying device 9.

Moreover, the height of the conveying surface 16, 16' is preferably equal to the height of the portion of lateral containment wall 14, 14' not covered by the wedge-shaped element.

The typical operation of the mobile elements 20, 20' is schematically shown in FIG. 3. It is the basis of the method of cutting and conveying rolling wires or bars using the shears according to the present invention. According to a preferred embodiment, such a method is carried out as follows.

Diverter 5 is placed in the first conveying position A and, simultaneously, the mobile element 20 is lowered up to a total opening of the respective central channel A2, with separation of channels A1 and A2 through the lateral containment wall 14, and the mobile element 20' is raised up to a total closing of channel B1. In this configuration, the wires or bars 1, 2 slide within channels A1 and A2.

Thereafter, after a predetermined time interval based on the advancement speed of the wires and the desired cutting length of the wire segments, deviator 5 is moved to position B; during the passage between position A and position B, the diverter passes by the intermediate cutting position T and there occurs a gradual change of position of the mobile elements 20, 20'. More in detail, the mobile element 20 rises up to a partial closure of the central channel A2, while the mobile element 20' is lowered up to a partial opening of the central channel B1. Preferably, at the intermediate cutting position T of diverter 5, the mobile elements 20, 20' are at the same height, as shown in FIG. 3c. Due to the inclination of the sliding surface 15, the tail of the segment of wire 2, just cut, is always accompanied towards the central channel A2.

When diverter 5 reaches position B, at the same time, the mobile element 20 is raised up to a total closure of channel A2, and the mobile element 20' is lowered up to a total opening of channel B1 with separation of channels B1 and B2 through the lateral containment wall 14'. In this configuration, the wires or bars 1, 2 slide within channels B1 and B2.

Thereafter, after the above predetermined time interval, deviator 5 is moved to position A; during the passage between position B and position A, the diverter again passes by the intermediate cutting position T and there occurs a gradual change of position of the mobile elements 20, 20'. The mobile element 20 lowers up to a partial opening of the central channel A2, while the mobile element 20 raises up to a partial closure of the central channel B1. Preferably, at the intermediate cutting position T of diverter 5, the mobile elements 20, 20' are at the same height, as shown in FIG. 3c. Due to the inclination of the sliding surface 15', the tail of the segment of wire 1, just cut, is always accompanied towards the central channel B1.

When diverter 5 reaches position A, the process restarts by carrying out again the above steps.

Figure 3A:
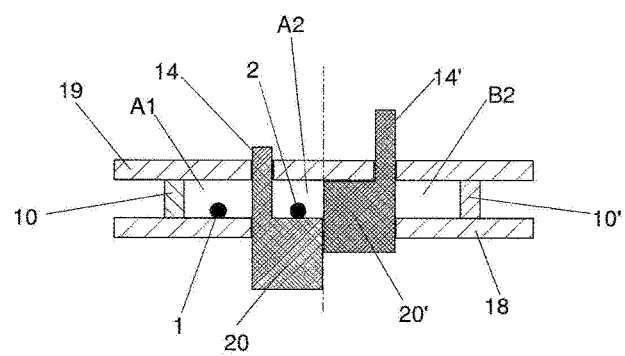
Figure 3B:
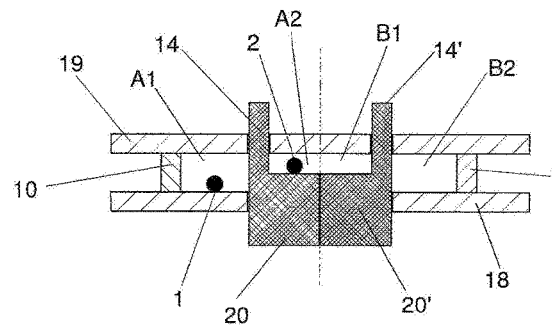
FIG. 3b shows the position of the mobile conveying elements during the opening and closing steps of the output channels of the wires corresponding to the position in FIG. 1b.
Figure 3C:
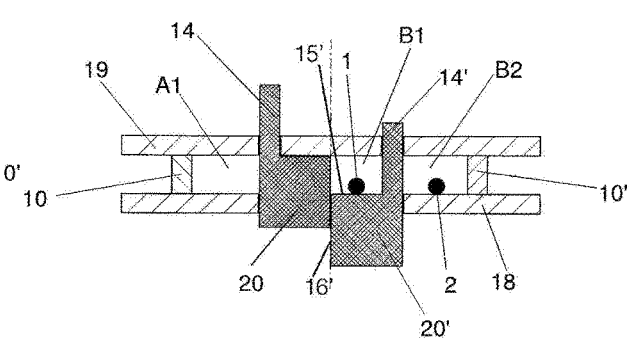
FIG. 3c shows the position of the mobile conveying elements during the opening and closing steps of the output channels of the wires corresponding to the position in FIG. 1c.

A better understanding of the cutting steps can be obtained by referring to FIGS. 3a, 3b and 3c.

When diverter 5 is in position A, corresponding to FIG. 3a, and thus the two wires 1, 2 run through channels A1 and A2, the mobile element 20 is lowered to leave channel A2 open, while the mobile element 20' is raised to close channel B1 and for the lateral surface 16' thereof to behave like a conveying wall of wire 2 towards channel A2.

When diverter 5 moves to reach position B, the two wires 1, 2 are cut often at the intermediate cutting position T of diverter 5, while the two mobile elements 20, 20' are moving in mutually opposite direction to change their position. This intermediate situation is shown in FIG. 3b. The sliding surface 15 of the mobile element 20 can advantageously be inclined downward, entering the respective central output channel, to prevent the tail of the segment of wire or bar from becoming jammed between the same surface 15 that is rising and the upper surface 19 which superiorly delimits all the channels.

When diverter 5 reaches position B (FIG. 3c), the two wires 1, 2 run through channels B1 and B2; the mobile element 20c is in lowered position leaving channel B1 open; the mobile element 20 is raised to close channel A2 and for the lateral surface 16 thereof to behave like a conveying wall of wire 1 towards channel B1.

At this point, diverter 5 will once again begin to move toward position A, passing by the intermediate cutting position T, and the cycle of the above steps will start again.

In the light of the invention described herein, it is thus possible to obtain several advantages compared to what has been used so far in the prior art. Such advantages may be essentially summarized as follows:

- it is possible to have a single machinery that replaces two or more shears,
- a single diverter can be used which adjusts the position of two wires,
- a single equipment can be used which processes and distributes all the segments cut from the starting wires and, finally, the cutting to size of two parallel wires or bars can be carried out even at very small distances even in high-speed condition of the same bars.

The invention claimed is:

1. A method of cutting and conveying rolling wires or bars using a shear, the shear for cutting and simultaneously conveying the wires or bars and comprising:
   i) a mobile diverter comprising at least two channels in each of which one of the wires or bars can slide;
   ii) counter-rotating knives acting on the wires or bars, thus producing one or more pairs of segments of wire or bar; and
   iii) a conveying device for conveying the one or more pairs of segments of wire or bar, comprising
      at least two pairs of output channels for conveying the one or more pairs of segments of wire or bar, and
      at least one pair of mobile elements that are independent of each other and synchronized with each other and with the mobile diverter so as to separately manage each segment of said one or more pairs of segments of wire or bar and insert each segment in a respective output channel of said at least two pairs of output channels,
   wherein the mobile diverter is configured to take:
   a first conveying position at which the wires or bars are conveyed in a first pair of the at least two pairs of output channels;
   a second conveying position at which the wires or bars are conveyed in a second pair of the at least two pairs of output channels;
   and an intermediate cutting position, between the first conveying position and the second conveying position, at which the wires or bars come into contact with the counter-rotating knives;
   and wherein a first mobile element of said at least one pair of mobile elements is positioned at an entrance of a first central output channel of said first pair of said at least two pairs of output channels, and a second mobile element of said at least one pair of mobile elements is positioned at an entrance of a second central output channel of said second pair of said at least two pairs of output channels, said second central output channel being adjacent to the first central output channel;
   the method comprising the following sequence of steps:
   a) providing the mobile diverter in said first conveying position, and simultaneously lowering said first mobile element up to a total opening of said first central output channel and raising said second mobile element up to a total closing of said second central output channel;
   b) moving the mobile diverter in a first direction towards the intermediate cutting position, and simultaneously raising the first mobile element up to a partial closure of the first central output channel and lowering the second mobile element up to a partial opening of the second central output channel;
   c) moving the mobile diverter in said first direction up to reaching said second conveying position, and simultaneously raising the first mobile element up to a total closure of the first central output channel and lowering the second mobile element up to a total opening of the second central output channel;
   d) moving the mobile diverter in a second direction, opposite to the first direction, towards the intermediate cutting position, and simultaneously lowering the first mobile element up to a partial opening of the first central output channel and raising the second mobile element up to a partial closure of the second central output channel;
   e) moving the mobile diverter in said second direction up to reaching said first conveying position;
   f) repeating steps a)-e).

2. A method according to claim 1, wherein in step a) the wires or bars slide inside the first pair of the at least two pairs of output channels; and in step c) the wires or bars slide inside the second pair of the at least two pairs of output channels.

3. A method according to claim 1, wherein in step b) and in step d), at the cutting position, the first mobile element and the second mobile element are at a same height.

* * * * *